United States Patent [19]

Illakowicz et al.

[11] 4,274,621
[45] Jun. 23, 1981

[54] TUBES AND STRUCTURES FORMED THEREBY

[76] Inventors: Jan Illakowicz, 43, Barn Way, Wembley, Middlesex; Derek B. Enfield, Unit 14, Alston Works, Barnes, Hertsford, both of England

[21] Appl. No.: 898,200

[22] Filed: Apr. 20, 1978

Related U.S. Application Data

[63] Continuation of Ser. No. 665,769, Mar. 11, 1976, abandoned.

[30] Foreign Application Priority Data

Mar. 14, 1975 [GB] United Kingdom ............... 10716/75

[51] Int. Cl.³ .......................... B23K 7/04; B23K 7/10
[52] U.S. Cl. ...................................... 266/61; 266/57; 266/76
[58] Field of Search ................... 148/9 R, 9.6; 266/48, 266/54, 55, 56, 57, 58, 59, 60, 61, 76, 77; 33/21 C

[56] References Cited

U.S. PATENT DOCUMENTS

| 1,858,077 | 5/1932 | Douglass et al. ...................... 266/54 |
| 1,858,078 | 5/1932 | Douglass et al. ...................... 266/54 |
| 3,900,346 | 8/1975 | Muller et al. ....................... 266/58 X |
| 3,936,714 | 2/1976 | Marshall et al. .................... 266/58 X |

FOREIGN PATENT DOCUMENTS

| 379166 | 8/1932 | United Kingdom ...................... 266/54 |
| 1017254 | 1/1966 | United Kingdom ...................... 266/54 |
| 1111900 | 5/1968 | United Kingdom ...................... 266/54 |
| 1201152 | 8/1970 | United Kingdom ...................... 266/54 |

*Primary Examiner*—Paul A. Bell
*Attorney, Agent, or Firm*—Arnold, White & Durkee

[57] ABSTRACT

A method and apparatus are disclosed for shaping an end of a tube in a configuration such that it may be joined to the surface of another body as by welding. The method disclosed involves profiling the end of a tube to conform to the surface of a body to which the tube end is to be joined, with a notional line on the end face that corresponds to the theoretical line of contact of the tube and body, cutting the tube wall at the profiled end to provide a beveled surface over the face of the end to the outer peripheral surface of the tube, and controlling the cutting so that the bevel surface formed progresses inwardly through the tube wall thickness to form a transition line on the profiled end face that substantially follows the notional line of contact between the innermost and the outermost peripheral edges of the profiled end face. The apparatus disclosed for shaping the end of an elongate tube has a mount to hold the tube adjacent to a cutter with a mechanism rotating the tube about its longitudinal axis relative to the cutter in order to cut around the periphery of the tube wall. A mechanism is further provided to displace the tube with respect to the cutter to form an acute angle therewith whereby a bevel surface may be cut on the end of the tube that extends between the end face of the tube and the outer peripheral surface of the tube. A cutter controller provided to displace the cutter radially relative to the tube and guide the cutter on a proper course about the periphery of the end face.

16 Claims, 16 Drawing Figures

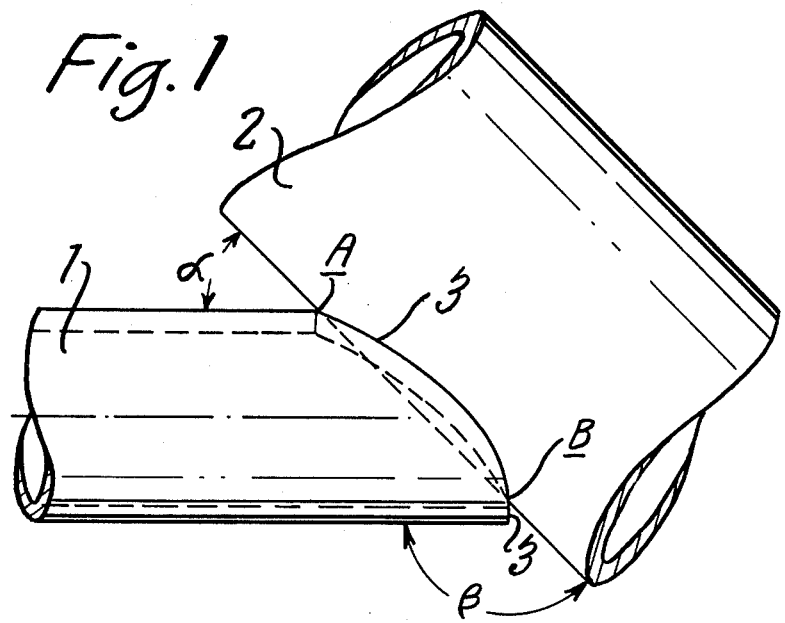
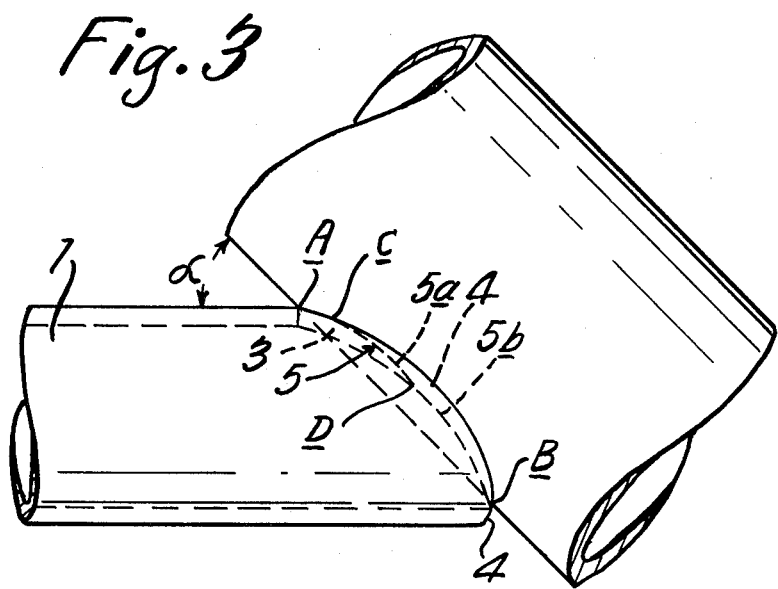

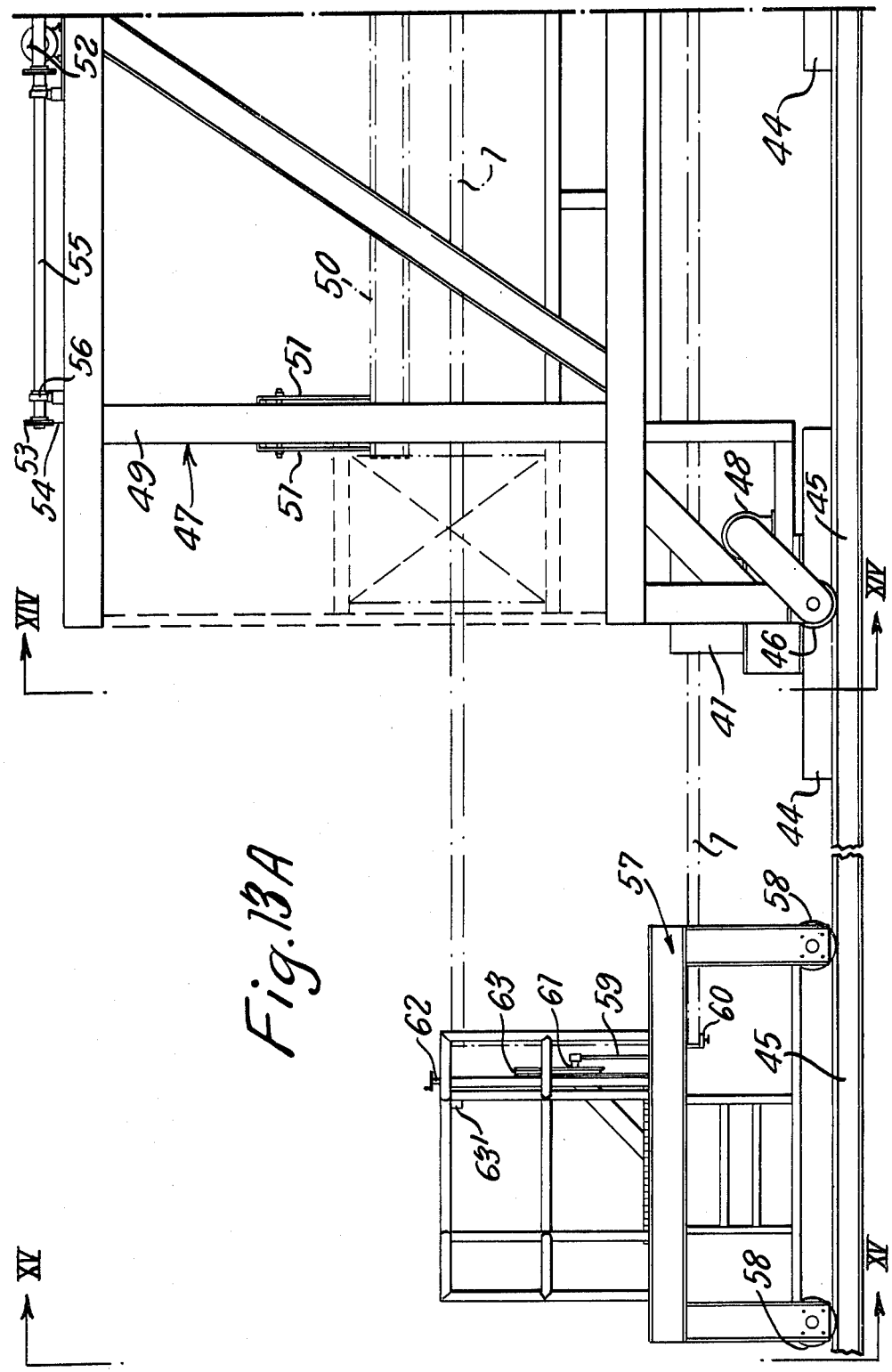

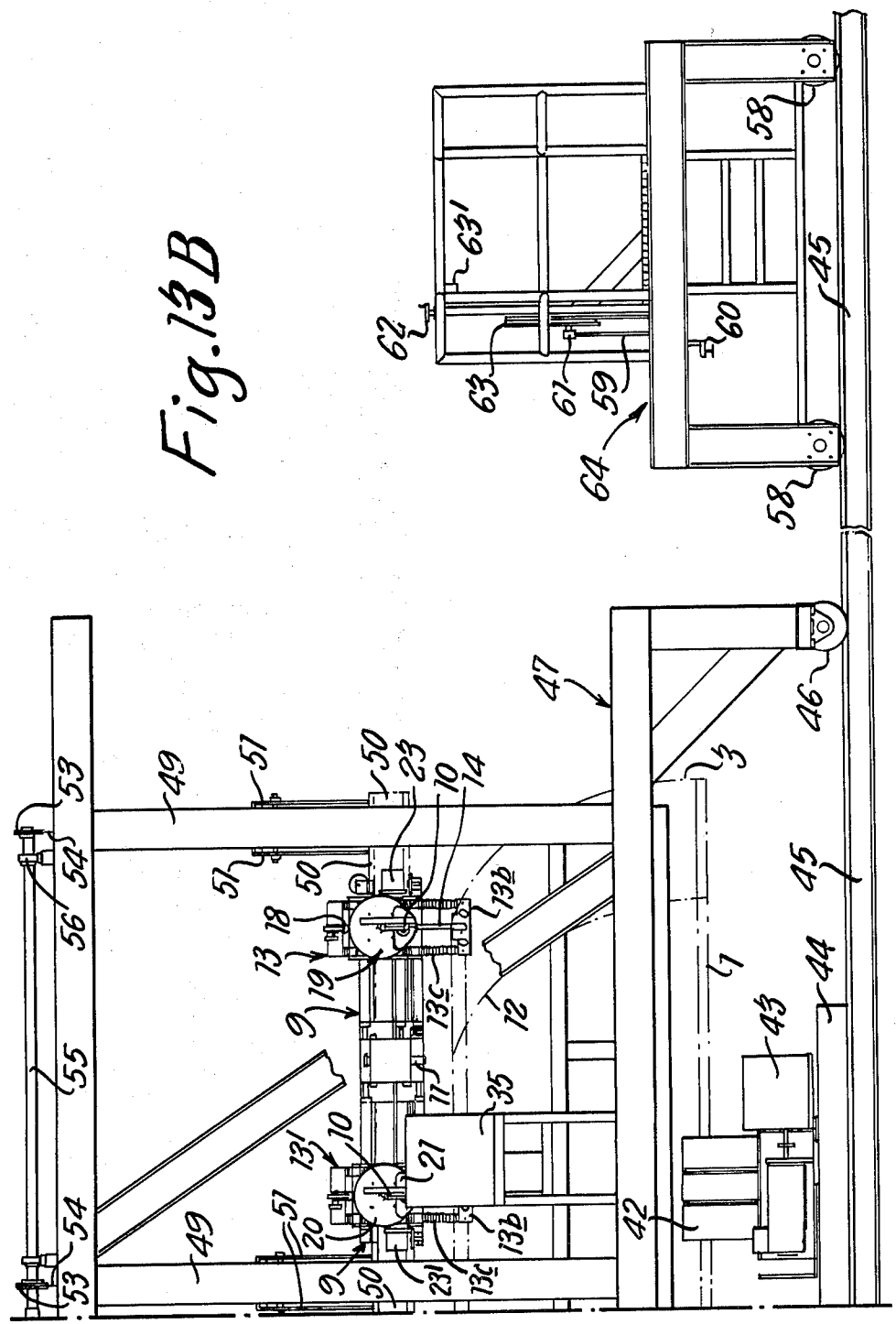

TUBES AND STRUCTURES FORMED THEREBY

CROSS REFERENCE OF RELATED APPLICATION

This application is a continuation of applicant's U.S. application, Ser. No. 665,769 filed Mar. 11, 1976 now abandoned.

BACKGROUND OF THE INVENTION

This invention relates to tubes and is particularly concerned with apparatus for, and a method of, shaping an end of a tube as may be required to facilitate the joining of that tube end to the surface of another body. More particularly the invention was developed to facilitate the shaping of a tube end for joining that end to a further body by welding and as such is primarily concerned with metal or plastics tubes.

It is conventional practice when welding an end of a tube to a non-flat surface, which may conveniently be regarded as the convex surface of a second tube, to profile the end of the tube, for example to provide an arcuate or saddle shape, so that that end can be positioned adjacent to or mounted to sit on the surface in substantially complementary relationship. If the tube has negligible wall thickness then by appropriate profiling its end may be regarded as making face-to-face contact with the curved surface of the second tube. However, if the tube has a substantial wall thickness, such as heavy duty tubes as are used, for example, in the construction of a framework or jacket in the assembly of off-shore drilling rigs (where it is not unusual for the tube to have a length in the order of 4 meters, an external diameter of 180 cms and a wall thickness of 12 cms) then, depending upon the positioning of the end of the tube on the curved surface and/or the angular relationship between the two tubes a condition may be obtained on the profiled end of the tube whereby, at one position the edge of the tube profiled end face on the inside surface of the tube will contact the curved surface while at a second position (peripherally spaced from the first position) the edge of the tube profiled end face on the outside surface of the tube will contact the curved surface. This particular configuration may result in an effective line of contact between the profiled end face of the tube and the curved surface which line progresses at least in part radially across the wall thickness of the tube end face between its inner surface and its outer surface. With thick walled tubes such as those aforementioned it has hitherto proposed to provide a continuous bevel or chamfer around the radially outermost peripheral edge of profiled end face so removing the corner portion of the tube between its outer peripheral surface and the end face and thereby reducing the thickness of the wall around the end of the tube. By so chamfering or bevelling the tube wall an effective peripheral channel may be formed when the tube is mated with the curved surface to which it is to be welded within which channel weld filler material may be applied to secure the bodies together. While such form of preparation of the tube end may be regarded as acceptable in conditions where the surface of the tube subtends an angle with the curved surface or tangent to that curved surface which is greater than, say, 55° it is found that if the aforementioned subtended angle is less than 55° the portion of the channel and adjacent part length of the tube in the region of the minimum subtended acute angle becomes extremely deep with the result that a considerable amount of welding time and filler material may be required to fill the channel and form an efficient weld. In an attempt to alleviate this difficulty of inefficient usage of weld material it has been proposed to provide so called transition bevelling whereby bevel portions are cut manually at discrete regions along the periphery of the profiled end face of the tube so that such bevel portions are located primarily at positions required to facilitate welding of the tube end to the further body and it is an object of the present invention to provide apparatus and a method which may facilitate such shaping and bevelling of the tube end.

SUMMARY OF THE INVENTION

According to the present invention there is provided apparatus for shaping an end of a tube having a longitudinal axis and comprising means for mounting the tube with its end adjacent to a cutter; means for imparting relative axial rotation between the cutter and tube for cutting around the periphery of the tube wall; means for imparting predetermined relative axial displacement between the tube and cutter during said relative rotation for substantially maintaining the position of the cutter on a predetermined peripheral path at the end of the tube whereby with the cutter at an acute angle with respect to the longitudinal axis of the tube a bevel surface may be cut at the end of the tube wall, said bevel surface extending between the end face of the tube and the outer peripheral surface of the tube and forming a junction line with the end face of the tube, and cutter control means by which the cutter is displaced radially relative to said longitudinal axis so that during said relative rotation and axial displacement between the tube and cutter the junction line formed follows a path wholly or partly around the periphery of the end face and which path is predetermined by said cutter control means.

Further according to the present invention there is provided a method of shaping an end of a tube which is to be welded to a curved surface of a further body which method comprises profiling that end of the tube to provide a profiled end face on which is located a notional line that corresponds to a theoretical line of contact between the end face and said curved surface for fitting the end of the tube to the curved surface in substantially complementary relationship; cutting the tube wall at the profiled end thereof to provide a bevel surface which extends between the profiled end face of the tube and the outer peripheral surface of the tube and controlling said cutting so that the bevel surface formed thereby progresses inwardly through the tube wall thickness to form a transition line with the profiled end face which transition line substantially follows the notional line of contact where that notional line deviates from the innermost and the outer most peripheral edges of the profiled end face as initially formed.

The cutter control means preferably comprises a displaceable mounting on which the cutter is carried. This mounting is arranged to be displaceable radially relative to the tube axis in response to a predetermined pattern which is followed by a follower device that moves relative to the pattern. The pattern is selected to determine the path of the junction line which is formed between the bevel surface and the end face of the tube. Conveniently the follower device is in the form of a cam follower and the pattern is in the form of a rotatable cam having a cam surface with which the cam follower engages; the predetermined radial displacement of the mounting and thereby of the cutter being a result of the cam follower moving over the cam surface during rotation of the cam. Desirably relative movement between the pattern and its follower is synchronized with a drive arrangment for imparting relative axial rotation between the cutter and tube so that the movement between the pattern and its follower imparts radial displacement to the mounting through a predetermined cycle which cycle is repetitive after each 360° relative axial rotation between the cutter and tube.

Although it is possible to rotate the cutter around the periphery of the tube end while the latter is stationary it is considered to be more convenient and it is preferred that the tube is mounted to exhibit rotation about the longitudinal axis and relative to the cutter so that the tube is intended to revolve past the cutter; in such an arrangment the cutter should be mounted substantially in a stationary plane which is parallel to and includes the longitudinal axis of the tube. Bearing in mind the desired synchronisation as abovementioned between the rotation of the tube and relative movement between the pattern and its follower, a first drive arrangement for axially rotating the tube is preferably synchronized with a second drive arrangement for rotating the cam as aforementioned so that the angular velocity at which the cam is rotated will substantially equal that at which the tube will be rotated.

It is preferred that the cutter is adjustably mounted or tiltable so that the angle which it subtends with the longitudinal axis of the tube is changeable. Heavy duty metallic tubes are generally cut using an oxygen or other gas mixture flame while heavy duty plastics tubes may be cut by use of a laser beam or plasma stream; for convenience such flame, beam or stream cutters are intended to be included in the term "flame" or "cutter" as referred to herein. To achieve efficient following of the notional line of contact during cutting of the bevel surface, the cutter when tiltably mounted should be so mounted for rotational movement in the aforementioned stationary plane and arranged to rotate about a secondary axis which is substantially perpendicular to the stationary plane and is remote from the cutter. The cutter may be controlled manually in so far as its rotational movement is concerned for changing the angle of the bevel surface. Alternatively, such rotational movement of the cutter may be controlled automatically by use of the Morgan system as is discussed in Morgan's U.K. Patent Specification No. 1,013,783. By the Morgan system the cutter is connected through a linkage to a pivot point the position of which is intended to be fixed relative to the longitudinal axis of the tube so that, during axial displacement between the cutter and the tube, the linkage automatically imparts rotational movement to the cutter, the extent of which movement is related to axial displacement between the cutter and the tube from a predetermined condition; consequently the angle subtended by the bevel surface with the axis of the tube in a plane which is parallel to the axis of the tube and includes both the axis and the cutter will be automatically changed to an extent predetermined by the linkage.

Conveniently the cutter is situated on a carriage which is intended for movement along a path parallel to the longitudinal axis of the tube, the carriage being movable relative to the tube axis by a drive arrangement which is responsive to line follower means. The line follower means serves to control the drive arrangment to automatically adjust the axial position of the carriage and thereby of the cutter to follow a predetermined profile for the end of the tube during relative rotation between the tube and cutter. Suitable line followers for automatically adjusting the position of the carriage and thereby of the cutter axially to follow the profiled end of a tube or so that the cutter follows a predetermined path relative to the periphery of a tube are well known in the cutting and welding art and as such will not be discussed in detail herein. However, it is envisaged that in practice a guide line will be marked on the tube to correspond with and be parallel to (but spaced from) the profiled end of the tube so that the guide line will be followed by an optical detector during relative rotation between the tube and the detector. The detector emits signals to the drive arrangment for the carriage so that the latter moves axially in either sense of direction to ensure that the cutter moves relatively along a path which is parallel to the guide line and follows the profiled end. This particular arrangment is most convenient for initial cutting of the tube to provide the profiled end. An example of a suitable line follower device is that sold by The British Oxygen Company Limited under the Trade Mark "FALCON 23". By the present invention the tube may be rotated about its longitudinal axis and relative to a cutter and axial displacement of the cutter controlled to cut the tube and provide the profiled end face. Furthermore the cutter may be radially displaced relative to the longitudinal axis of the tube and to the profiled end face to cut the tube wall and form the bevel surface while such radial displacement of the cutter is synchronized with rotation of the tube so that the cutter substantially follows the notional line of contact to form the transition line. In the majority of cases the profiled end face will be formed to correspond to the notional line of contact in such profiled end face passing through a first position on the outer peripheral edge of the profiled end face and through a second position peripherally remote from the first position on the inner peripheral edge of the profiled end face. In such cases the bevel surface will be cut to form a transition line which progresses radially inwardly relative to the longitudinal axis of the tube substantially through the wall thickness of the tube from or towards the first position on the external peripheral surface of the tube wall to or towards the second position on the internal peripheral surface of the tube wall. Preferably the end of the tube is cut initially so that the profiled end face formed thereon is maintained at substantially 90° to the longitudinal axis of the tube throughout the peripheral extent of that end face. By such initial formation of the profiled end face the profiled end of the tube can then be shaped by cutting the bevel surface so that when the tube is positioned adjacent to the curved surface to which it is to be welded, the aforementioned first position of the tube wall can be located on the outer peripheral surface of the tube to correspond to a position in which a minimum acute angle or right angle is subtended between that peripheral surface and the curved surface or tangent thereto of the body to which the tube is to be welded while the aforementioned second position of the tube wall is located to correspond with the position at which the outer peripheral surface of the tube subtends an obtuse angle with the curved surface or tangent to such suface of the body to which the tube is to be welded. The effect of this arrangement is to provide a channel wholly or partly around the periphery of the tube between the profiled end of the tube and the curved surface which channel progressively deepens and possibly broadens as it approaches the said second position from the first position - thereby permitting efficient usage of the weld material to fill the channel while any peripheral region of the tube havng no such channel may be welded within the angle subtended between the peripheral surface of the tube and the curved surface on the body with which the tube is mated.

More particularly the present invention provides a method of shaping an end of a tube which is to be welded to a curved surface of a further body so that the axis of the tube is disposed in a predetermined angular relationship with the curved surface of the further body which method comprises profiling the end of the tube to provide a profiled end face having a shape by which the tube is intended to be positioned adjacent to the curved surface of the further body with said tube substantially contacting the further body at a first position on the outer peripheral edge of the end face and at a second position on the inner peripheral edge of the end face peripherally remote from the first position and so that a notional line in said profiled end face includes said first and second positions and corresponds to a theoretical line of contact for fitting the end face to said curved surface in substantially complementary relationship and at the predetermined angular relationship; cutting the profiled end of the tube wall to provide a bevel surface thereon which extends between the profiled end face of the tube and its outer peripheral surface, and controlling the cutting of the bevel surface so that the junction between the profiled end face and the bevel surface forms a transition line which line substantially follows said notional line where that line deviates from the outer and the inner peripheral edges of the profiled end face as initially formed and progresses inwardly from the outer edge to the inner edge of the profiled end face from or towards the first position to or towards the second position so that the profiled end face can be mounted adjacent to the curved surface at the predetermined angular relationship with substantially line contact along said notional line and the curved surface. This particular method is convenient for shaping an end of a substantially cylindrical tube which is to be mounted on a cylindrical surface of a further body so that the axis of the tube is disposed at a predetermined acute angle relative to and in a common plane with the axis of the cylindrical surface of the further body. The cylindrical tube may therefore have its end profiled to provide the profiled end face with a shape by which the tube is intended to be mounted adjacent to the cylindrial surface of the further body and with said tube substantially contacting the further body at the first position on the outer peripheral edge of the profiled end face in which the cylindrical outer surface of the tube subtends an acute angle in said common plane with the cylindrical surface of the further body and at the second position on the inner peripheral edge of its profiled end face in which the cylindrical outer surface of the tube subtends an obtuse angle in said common plane with the cylindrical surface of the further body and so that the notional line in the profiled end face includes said first and second positions and corresponds to the theoretical line of contact for fitting the profiled end face to the curved surface in substantially complementary relationship with the respective axes disposed at the predetermined acute angle. The profiled end of the tube wall may then be cut to provide the bevel surface which extends between the profiled end face of the tube and its outer cylindrical surface. Such bevel cutting is controlled so that the transition line formed between the end face and the bevel surface progresses inwardly to substantially follow the notional line from the outer to the inner cylindrical surface of the tube from, or towards, the first position to, or towards, the second position so that the profiled end face can be mounted adjacent to the cylindrical surface of the body with substantially line contact along the notional line and the cylindrical surface.

As aforementioned the cutting of the bevel surface may be controlled so that the bevel angle subtended by the bevel surface with the longitudinal axis of the tube varies along the peripheral extent of the bevel surface, these variations in the bevel angle being controlled by changing the angle of the cutter relative to the axis of the tube. Usually the angle of the cutter will be changed during cutting of the bevel surface solely during relative axial displacement between the cutter and tube.

Preferably, when cutting a cylindrical tube, the flame of the cutter is arranged to pass at 90° through a notional axis which notional axis is maintained substantially perpendicular to a plane which is parallel with and includes the longitudinal axis of the tube and is also maintained in a plane tangential to the tube wall; during cutting of the bevel surface, the intersection of the aforementioned tangential plane and the notional axis should be controlled so that such intersection is maintained on the notional line of contact.

Further, when it is intended that the angle subtended by the bevel surface with the axis of the tube should be changed along the periphery of the profiled end face, then such bevel angle should be varied by rotating the cutter about the aforementioned notional axis and in that plane which is parallel to and includes the longitudinal axis of the tube.

The present invention will usually be applied to the shaping of an end of a tube which is to be welded to a convex curved surface although the possibility is envisaged of applying the invention to tube ends which are to be welded to concave surfaces. Although the tube to be shaped will usually be cylindrical as aforementioned the invention may be used for shaping tubes of other section, for example of eliptical or polygonal section. Furthermore, the curved surface to which the tube is to be welded will not necessarily be of cylindrical form and may, for example, be of spherical or eliptical configuration.

It is envisaged that the invention will mainly be applied to the preparation of a cylindrical tube end for welding to the cylindrical surface of a further tube, for example as above mentioned in the construction of tubular steel jackets for off-shore drilling rigs and in such a combination, although convenient, it is not considered essential for the axes of the two tubes to intersect each other. For example, on this latter point the tube having the profiled end may be welded to a further tube having a considerably larger diameter so that the two tubes extend at an acute or right angle with respect to each other with the profiled tube positioned partially or wholly to one side of a plane which is parallel to the axis of the profiled tube and includes the axis of the larger diameter tube. Furthermore, the tube having the profiled end may be welded into a junction of two or more further tubes (which together may be regarded as constituting the surface of the further body) so that the profiled end would eventually be welded partially to each of the further tubes; such an arrangement may necessitate complex geometrical profiling for the end face but nevertheless appropriate transition bevelling may be provided in accordance with the invention, particularly by appropriate design of the cam or other pattern which may determine the radial displacment of the cutter.

DESCRIPTION OF THE DRAWINGS

Embodiments of the present invention will now be described by way of example only with reference to the accompanying illustrative drawings in which:

FIG. 1 is a side elevation showing two cylindrical tubes in a position in which they are intended to be joined together with a branch tube having an end profile for mating with the cylindrical surface of the other main tube;

FIG. 3 is a similar view to that shown in FIG. 1 and illustrates the manner in which the profiled end of the branch tube is to be shaped with a bevel surface and mounted on the main tube in substantially complementary relationship in accordance with the present invention;

FIG. 13 (A and B) is a side elevation of a further embodiment of tube cutting apparatus constructed in accordance with the present invention and by which the end of the branch tube shown in FIGS. 1 to 5 may be profiled and shaped while said branch tube is disposed with its axis horizontal;

DESCRIPTION OF THE PREFERRED EMBODIMENTS

In the construction of a steel framework or jacket as used in the assembly of an off-shore drilling rig it is often necessary for a cylindrical tube 1 to have an end welded to a further cylindrical main tube 2 to branch therefrom with the respective axes in a common plane Y and inclined at an acute angle $\alpha$ (which could be, say 45°) to each other (see FIG. 1). The branch tube 1 which is usually formed of high tensile steel may have an external diameter in the order of 2 meters and a wall thickness of 12 cms while the main tube 2 has an external diameter somewhat larger than that of the branch tube. To achieve an effective join the end of the tube 1 is profiled to provide an end face 3 which straddles the cylindrical surface of the tube 2 so that the tube 2 is intended to be received in complementary relationship within the saddle surface of the profiled end and with the end face 3 adjacent to the cylindrical surface of the tube 2.

Figure 2:
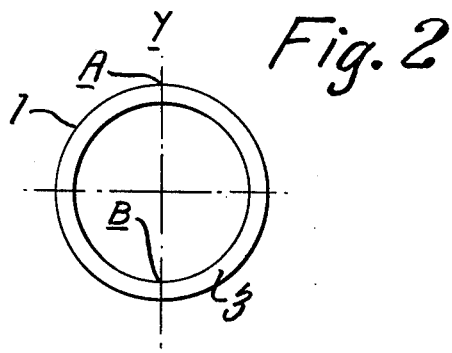
FIG. 2 is an axial view of the profiled end of the branch tube in FIG. 1.
Figure 4:
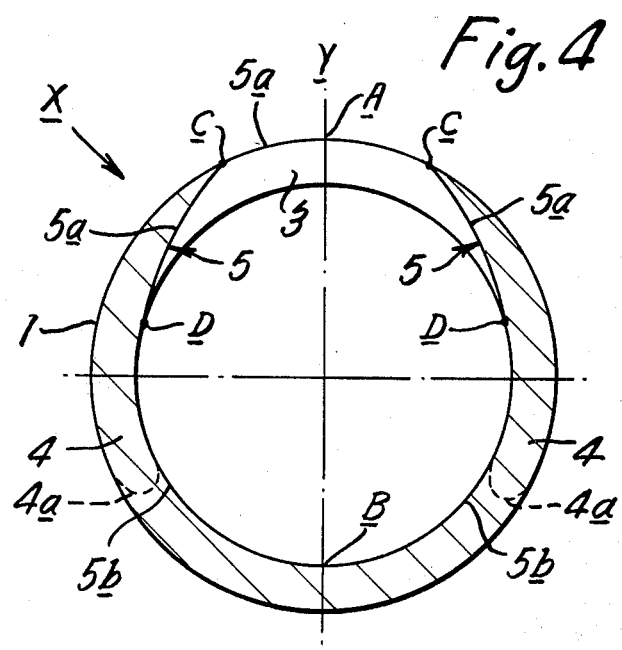
FIG. 4 is an axial end view of the branch tube shown in FIG. 3 and illustrates the form of a transition line provided between the bevel surface and the profiled tube end face.

If the end face 3 is considered as being disposed at 90° to the axis of the tube 1 throughout its peripheral extent, and bearing in mind that the tube 1 has a relatively thick wall, it will be seen from FIG. 1 that for the tubes to be mated in complementary relationship the external cylindrical surface of the tube 1 will substantially abut the cylindrical surface of the tube 2 at a first position A where the external surface of the tube 1 subtends the acute angle $\alpha$ with the cylindrical surface of the tube 2 in the aforementioned common plane Y while the inner cylindrical surface of the tube 1 will substantially abut the cylindrical surface of the tube 2 at a second position B where the external surface of the tube 1 subtends an obtuse angle $\beta$ with the cylindrical surface of the tube 2 in the common plane Y. This being the case, by appropriate profiling of the end of the tube 1 there may be regarded as a notional line in the plane of the profiled end face 3 which line is symmetrical about the common plane Y, will pass through the positions A and B and is capable of providing substantially line contact in complementary relationship with the cylindrical surface of the tube 2. This notional line of contact will move radially inwardly over the end face 3 as it progresses around the periphery of the profiled end from or towards the position A to or towards the position B. With the end of tube 1 appropriately profiled a notional line of contact as shown in FIGS. 3 and 4 can be provided; this notional line (as seen axially of the tube) is constituted by a first part 5a that passes through the position A on the tube and terminates at the inner cylindrical surface of the tube, and a second part 5b which substantially coincides with the inner cylindrical surface of the profiled tube end and extends between the terminals of the first part 5a to pass through the position B. Once this notional line 5a, 5b has been determined it will be apparent that by shaping the profiled tube end to provide a bevel surface 4 (see FIG. 5) which extends between the end face 3 and the external cylindrical surface of the tube 1 and forms with the end face 3 a transition line 5 which substantially corresponds to the part lengths of the notional line 5a, which extend from the outer to the inner peripheral edges of the end face 3 (that is between the points C and D in FIG. 5), the tube end so shaped may be mounted on the main pipe 2 in substantially complementary relationship with the transition line 5 closely adjacent to or in contact with the cylindrical surface of tube 2. With the tubes mounted in this complementary relationship they may then be welded together with the weld filler material following a track constituted by the channel formed around the profiled end of tube 1 between the bevel surface 4 and the cylindrical surface of tube 2. Where necessary the weld filler material will extend between the external cylindrical surface of tube 1 and the cylindrical surface of tube 2, this may be especially so in the peripheral tube end region of position A where the radial depth and axial width of the channel formed by the bevel surface may be insufficient to accommodate the necessary volume of weld material.

The profiled end face 3 (see FIG. 5) of the tube 1 may initially be cut so that it contains the notional transition line and always extends at 90° to the axis of the tube 1; by such initial cutting a clearance may be provided (when seen in a section taken radially of the tube 1) between the cylindrical surface of the tube 2 and the majority of the peripheral length of the end face 3 which is radially inwardly of the transition line and that any such end face 3 will usually diverge from the surface of tube 2 as the end face 3 progresses radially inwardly of the tube 1. The effect of this diverging clearance should alleviate the difficulty of void detection between the tube end face 3 and the tube 2 during ultrasonic testing of the weld. If necessary the radially inner part of the end face 3 may be chamfered to provide additional diverging clearance.

Alternatively the profiled end face 3 of the tube 1 may initially be cut so that it contains the notional transition line and extends at a constant predetermined acute or obtuse angle to the axis of the tube 1 (in effect so that the profiled end face 3 is in the form of a positive or a negative bevel or chamfer partially or wholly around the end of the tube). Initial preparation of the end face 3 in this way and with a positive bevel to the end face 3 may be desirable in circumstances where, for example, the angle α between the tubes 1 and 2 is greater than say 50° and, at position B in FIG. 3, there would be insufficient angular clearance for efficient welding if the end face 3 was formed at 90° to the axis of its tube.

We will now consider with reference to FIGS. 6 to 12 a first embodiment of apparatus by which the end of the branch tube 1 can be appropriately shaped by profiling and bevelling as above described.

The tube 1 is mounted with its axis vertical so that its lower end stands on a horizontal turntable 6. The turntable 6 is mounted on a bogie 7 and is rotatable on the bogie about a vertical axis by an electric motor 7a. The bogie permits horizontal adjustment in the positioning of the tube 1 relatively towards and from a vertical column 8 carried by a tubular support frame 8a. With the tube 1 centrally disposed on the turntable 6, the correct positioning of the bogie 7 (and thereby of the tube ) is achieved when the external cylindrical wall of the tube abuts a roller 6a mounted for rotation about a vertical axis on a frame part 6b fixed relative to the column 8. Mounted on the column 8 for controlled vertical movement up and down the column is a carriage 9 which carries a flame cutter 10 fuelled by an oxygen mixture gas through pipes 10'. The position of the carriage 9 along the column 8 may be controlled through a rack and pinion mechanism (not shown) from an appropriate drive unit. The carriage 9 is counterbalanced through an interconnecting chain 8b by a weight 8b' slidably housed in the support frame 8a.

The tube 1 is mounted on the turntable 6 in an uncut condition (save for the lowermost end of the tube being cut to lie in a radial plane so that it will stand vertical on the turntable) and thereafter the tube is initially cut to provide the end face 3 which conforms to the appropriate profile and which has in its plane the aforementioned notional line 5a, 5b for mating with the cylindrical surface of the tube 2 in complementary relationship. In the present example the end face 3 will, for convenience, be considered as extending at 90° to the axis of the tube 1 throughout the peripheral extent of the face 3. To achieve this initial profiling the cutter 10 is positioned and maintained on the carriage 9 so that its flame projects radially into the wall of the tube while the latter is axially rotated with the turntable 6 and the carriage 9 is displaced vertically on the column 8 to cut a predetermined shape (shown at 3' in FIG. 6) around the periphery of the tube which corresponds to the end face 3. In this way the end face 3 which is exposed on the lower portion of the tube after removal of the upper severed portion of the tube is always at right angles to the axis of the tube irrespective of the axial positioning of the end face over the length of the tube. Vertical displacement of the carriage and cutter 10 is automatically controlled by a line follower device, known in the art, so that the carriage 9 is adjusted in its vertical positioning on the column 8 as a result of control signals derived from an optical scanning unit 11 positioned vertically below the cutter 10 on the carriage 9. The unit 11 follows a line 12 previously drawn around the periphery of the tube 1 to correspond with the desired path of line 3' but axially spaced therefrom by a vertical distance corresponding to the vertical spacing between the cutter 10 and optical scanner 11. In this way as the scanner 11 is adjusted vertically to follow the line 12 the carriage 9 and thereby the cutter 10 automatically moves to cut the appropriately shaped end profile. If required either or both the cutter 10 and scanning unit 11 can be axially adjustable on the carriage 9 to facilitate setting in determining the axial length of the cut pipe (especially if the axial positioning of the line 12 on the tube is inaccurate).

Figure 9:
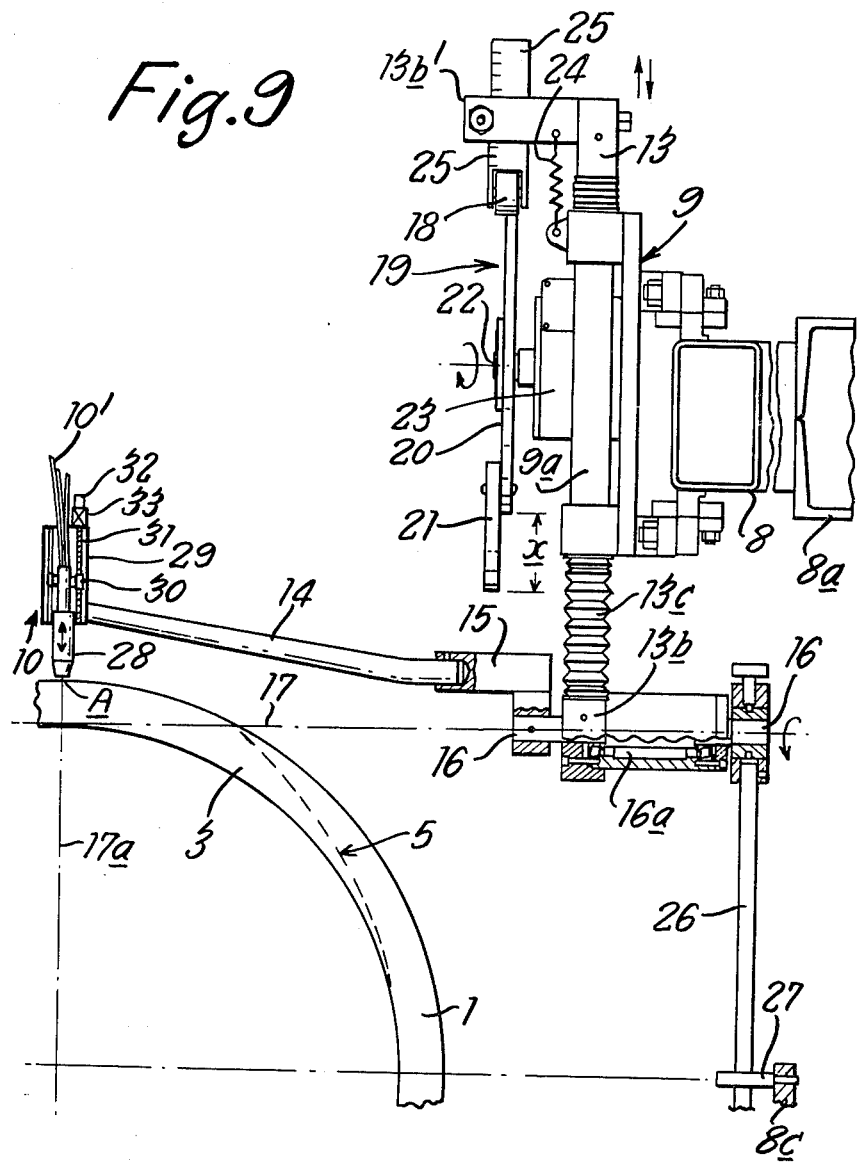
FIG. 9 is an enlarged part of the apparatus shown in FIGS. 6 to 8 and illustrates a plan view of a carriage and associated devices for controlling displacement of the cutter radially relative to the tube and tilting movement of the cutter.
Figure 10:
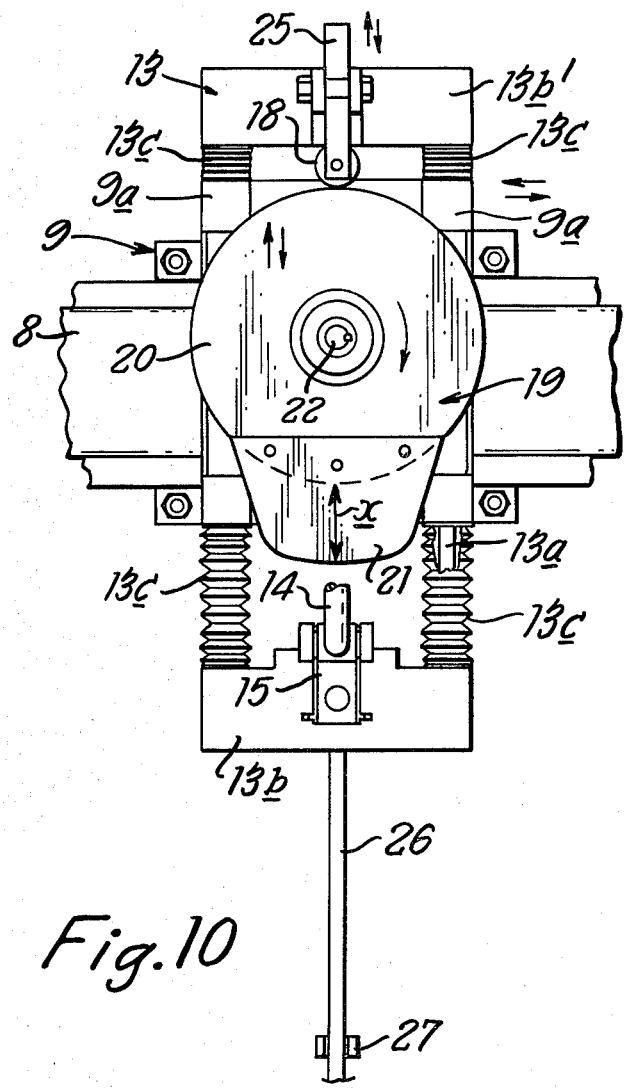
FIG. 10 is a side elevation of the arrangement shown in FIG. 9.

After cutting of the end face 3 the apparatus is prepared for cutting the bevel surface 4 and we will now describe with particular reference to FIGS. 9 and 10 the manner in which the cutter 10 is carried on the carriage 9 in order to achieve cutting of the bevel surface 4. For convenience the optical scanning unit 11 has been omitted from the carriage 9 in FIGS. 9 and 10.

The carriage 9 includes a sub-frame 13 which is movable vertically with the carriage but is displaceable horizontally thereon in a direction parallel to, but not including, a radial line of the tube 1 and it is this sub-frame 13 which actually carries the cutter 10. The sub-frame 13 comprises a pair of parallel rods 13a which are horizontally slidable in linear bearings through tubes 9a on the part of the carriage 9 which is capable only of vertical displacement and which rods 13a are interconnected by cross members 13b and 13b' of the sub-frame. The part lengths of the rods which extend from the tubes 9a are enclosed within bellows 13c which protect the rods and may retain lubrication for the linear bearings. The cutter 10 is mounted at the end of an arm 14 which lies in a radial plane of the tube 1 and which is rigidly carried by a block 15. The block 15 is mounted on a shaft 16 extending from the cross member 13b so that it can rotate with the shaft and in bearings 16a in the cross member 13b about an axis 17 (see FIG. 9)

which extends tangentially to the wall of the tube 1. The axis 17 is located in a plane at right angles to the axis of the tube 1 and extends at right angles to a plane which includes both the axis of tube 1 and the flame of cutter 10. The cutter 10 is positioned on the arm 14 so that its flame intersects the axis 17 at 90° and consequently if that intersection is maintained in the end face 3 it will be apparent that by appropriate rotational adjustment of the block 16 about the axis 17, the flame from the cutter 10 may either be directed parallel to the end face 3 or at progressively increasing angles relative to the plane of the end face 3 to cut a bevel surface at the outer periphery of the profiled end of the tube 1. For example, by rotating the cutter 10 about the axis 17 and securing it at a predetermined angle relative to the axis of the tube, and thereafter axially rotating the tube while the axis 17 is located and maintained at a tangent to the internal cylindrical surface of the tube 1 (as drawn in FIG. 9), a bevel surface will be cut around the full external periphery of the profiled end of the tube which bevel is of constant radial depth corresponding to the wall thickness of the tube.

Having this in mind, if it is now envisaged that the sub-frame 13 is adjusted to move the intersection of the cutting flame and the axis 17 radially outwardly through the wall thickness of the tube 1 whilst retaining the axis 17 substantially tangential with the tube and the aforementioned intersection in the plane of the end face 3, it will be found that during cutting of the bevel surface that surface forms a transition line (5) with the profiled end face 3 which line moves progressively radially outwardly through the wall thickness of the tube 1 as the tube progressively rotates; this is the basis on which the bevel surface in accordance with the present invention may be provided.

As previously discussed, the desired transition line 5 for the profiled end of tube 1 should substantially correspond to the part lengths C to D of the notional line part 5a (FIG. 5) and consequently the radial positioning of the axis 17 relative to the tube 1 has to be controlled so that during relative rotation between the cutter 10 and the tube the bevel surface 4 is cut to form the transition line 5. To provide this control for the positioning of the tangential axis 17 radially relative to the wall thickness of the tube 1, the cross member 13b' (see FIG. 9) of the sub-frame 13 carries a cam follower in the form of a roller 18. This roller 18 is mounted to run over a pattern constituted by the peripheral surface of a cam plate 19. The cam plate is conveniently formed by a circular disc 20 and a kidney shaped plate 21. The disc and plate 20, 21 are coupled together and mounted for unified rotation about, and are driven by, a shaft 22 of an electric motor 23. The shaft 22 is concentric with the disc 20 and this shaft together with its motor are carried by the carriage 9 to be vertically displaceable therewith. If required, spring means such as that shown at 24 (FIG. 9) can be provided between the fixed tubes 9a of the carriage 9 and the sub-frame 13 to bias the roller 18 into engagement with the periphery of the cam plate 19.

When the cam plate is rotated by the shaft 22 it will be apparent that there will be no displacement of the sub-frame 13 relative to the tubes 9a for so long as the roller 19 follows the cylindrical surface of the disc 20. However, immediately the roller 19 moves on to the peripheral surface of the kidney plate 21 there will be displacement of the sub-frame 13 radially relative to the tube 1 and this displacement progressively moves the sub-frame 13 to a maximum radial distance outwardly of the tube 1 thereafter progressively permitting the sub-frame 13 to return to the minimum radial distance from the tube 1 as the roller 19 moves from the periphery of plate 21 to return to the circumferential surface of the disc 20.

The drive to the shaft 22 by the motor 23 is synchronised with rotation of the turntable 6 and thereby the tube 1 so that the tube 1 and cam plate 19 are rotated at the same angular velocity whereby one revolution of the tube corresponds to one revolution of the cam plate.

The shape of the cam surface presented by the cam plate 19 to the roller 18 is predetermined in accordance with the geometrical configuration of the notional line which is located on the tube end face 3 and bearing in mind that while the roller runs over the surface of disc 20, the intersection of the flame from the cutter 10 and the axis 17 is not radially displaced relative to the tube 1 and that as the roller engages with the kidney plate 21 such intersection may be radially displaced through the pipe wall thickness. Consequently, in the present example, the cam surface part presented by the plate 21 is intended to determine the shape of the notional line where this deviates from the cylindrical inner edge of the profiled end face 3 (as viewed axially of the tube 1). Since the intersection of the cutter flame with the axis 17 is intended to be displaced through the wall thickness of the tube 1 during rotation of the latter, then the maximum radial distance from the peripheral surface of the kidney plate 21 to the axis of shaft 22 less the radius of the circular disc 20 should substantially equal the wall thickness of the tube 1 (that is in FIGS. 9 and 10 the distance x is equal to the radial wall thickness of the tube 1). The shape of the periphery of the plate 21 with which the roller 18 engages will therefore substantially correspond to the shape of the notional line (as viewed axially of the tube) where this line extends remote from the inner peripheral edge of the profiled end face 3 (that is the notional line part 5a in FIGS. 4 and 5).

To form the transition line 5 the cam plate 19 is first rotated through 180° relative to the roller 18 from the position shown in FIGS. 9 and 10 while the tube 1 is positioned relative to the cutter 10 so that the cutter is located adjacent to the first position A on the profiled end of the tube with the axis 17 located tangentially to the outer cylindrical surface of the tube end face. The assembly of the cutter 10, arm 14 and block 15 is rotated about the axis 17 to provide a required angle at which, for example, the cutting flame subtends an angle of 15° with the axis of the tube while the cutting flame will lie in a plane which includes the tube axis and will intersect the axis 17 in the end face 3. Flame cutting is now initiated simultaneously with axial rotation of the tube 1 (which is synchronised with rotation of the cam plate 19 about shaft 22) and vertical displacement of the carriage 9 over the column 8 under control of the optical follower 11 to maintain the intersection of the cutter flame with the axis 17 in the plane of the end face 3.

During movement of the roller 18 over the periphery of plate 21 the sub-frame 13 is progressively displaced upwardly in FIG. 9 and thereby progressively displaces the intersection of the cutting flame and axis 17 in the end face 3 radially outwardly from the inner cylindrical surface towards the outer cylindrical surface of the tube 1 so that the transition line 5 follows the part length C to D of the notional line part 5a. When both the cam plate and tube have rotated through 180° the intersection of the cutting flame and axis 17 will be positioned at the inner peripheral edge of the tube at the second position B (corresponding to where the angle B is to be formed between the welded tubes). Continued rotation of the pattern beyond the aforementioned 180° position progressively raises the sub-frame 13 and causes the intersection of the cutting flame with the axis 17 to move radially outwardly through the wall thickness of the tube in the plane of the end face 3 to progressively decrease the radial depth of the bevel surface 4 until the roller 19 eventually moves back to the centre point of its maximum displacement on the peripheral surface of plate 21 where no bevel surface is formed and one revolution is simultaneously completed for the cam plate 19 and the tube 1. As an alternative to the aforementioned 360° continuous rotation of the tube 1 relative to the cutter, cutting of the bevel surface may be achieved by initially setting up the cutter at the position A as above described and then rotationally reciprocating the turntable and tube so that first one transition line side C to d of the tube is cut with the turntable 6 rotating in one direction and thereafter the turntable is reversed so that the cutter passes through position A and cuts the opposite transition line side C to d of the tube (during such reciprocal rotation of the tube it is ensured that rotation of the cam plate 19 is reciprocated in synchronisation therewith).

Since the correct positioning of the tube 1 in the apparatus is determined by the correct location of the external cylindrical surface of the tube (that is when this surface abuts the roller 6a) by movement of the bogie 7, it should be ensured prior to initial bevel cutting for tubes of different wall thicknesses that the radial position, relative to the tube, of the axis 17 in FIG. 9 is correctly adjusted so that that axis lies tangentially to the inner circumferential surface of the tube end. To facilitate such adjustment, the roller 18 is carried on a bar 25 of the sub-frame 13 which bar is adjustable relative to the remaining part of the sub-frame so that the cross member 13b and thereby the axis 17 can be raised and lowered (see FIGS. 9 and 10) relative to the roller 18 in accordance with the tube wall thickness. Conveniently the strut 25 is calibrated as shown in FIG. 9 for various tube wall thicknesses.

If the angle subtended by the flame cutter 10 with the axis of the tube 1 is maintained constant during the formation of the bevel surface, the bevel surface as a whole so formed may be unsuitable since the bevel angle formed between a particular region of the bevel surface and a plane which is tangential to the cylindrical surface of the tube 2 at that region will vary around the peripheral extent of the bevel surface as a result of axial displacement between the tube and cutter as the latter follows the profiled end shape. For example, if the tube 1 is rotated to a very small extent while the cutter 10 undergoes a considerable vertical displacement, there will be negligible bevel on the part of the profiled end surface corresponding to such vertical displacement of the cutter since this part of the profiled end face may be considered as lying in a plane parallel to, and which includes, the axis of the tube 2. Desirably the angle subtended by the bevel surface and the plane which is tangential to the cylindrical surface of the tube 2 should be constant (preferably in the range 45° to 60°) for all regions around the periphery of the bevel surface. To achieve such a constant subtended angle it is necessary that the angle subtended between the cutter 10 and the axis of tube 1 during formation of the bevel surface is changed progressively as the cutter moves around the periphery of the profiled end from a subtended angle of, say, 15° between the cutter 10 and the axis of tube 1 in the positions C progressively increasing to 90° in the peripheral region of position B. The angle of the cutter 10 relative to the axis of the tube 1 is changed by rotating the block 15 and thereby the cutter 10 about the axis 17 (so ensuring that the intersection of the cutting flame and the axis 17 is maintained in the plane of the profiled end face 3). Adjustment of the angle of the cutter 10 by rotation about the axis 17 as appropriate may be controlled manually. Alternatively, however, automatic adjustment of the cutter angle may conveniently be provided by use of the control system disclosed by Morgan in British Patent Specification No. 1,013,738. By the Morgan system a rod 26 is fixed at one end for rotation with the shaft 16 and is coupled at its other end for rotation about a pin 27 which is secured to a vertical secondary column 8c. The rod 26 extends radially relative to both the shaft 16 and pin 27 while the axis or centre line of the latter intersects the axis of the tube 1. Further, the axis or centre line of the pin 27 lies in a plane which includes the axis of the tube 1 and which is at 90° to the plane which includes the axis of the tube 1 and the cutter 10. The coupling between the rod 26 and pin 27 permits a lost motion effect between these components and conveniently is formed by the end of the rod 26 being received within a bifurcated part of the pin 27 so that the distance between the shaft 18 and pin 27 may be increased or decreased.

Figure 5:
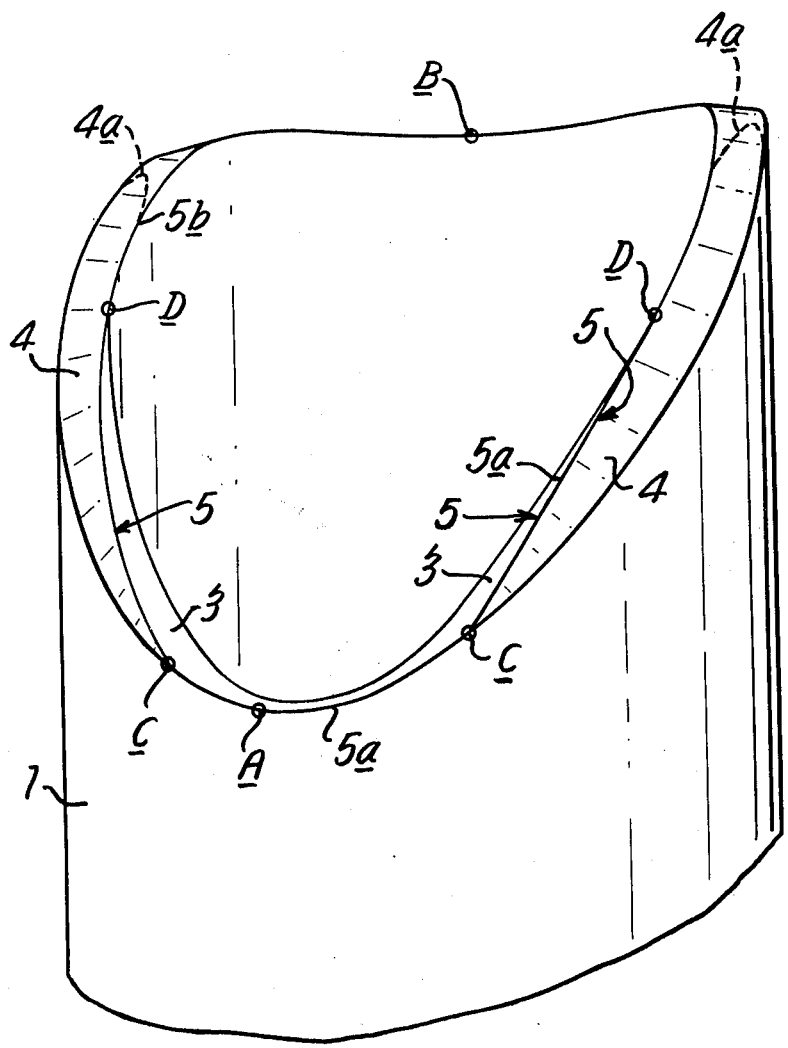
FIG. 5 is a perspective view of the profiled end of the branch tube and illustrates the bevel surface and end face as seen from the direction of arrow X in FIG. 4.
Figure 8:
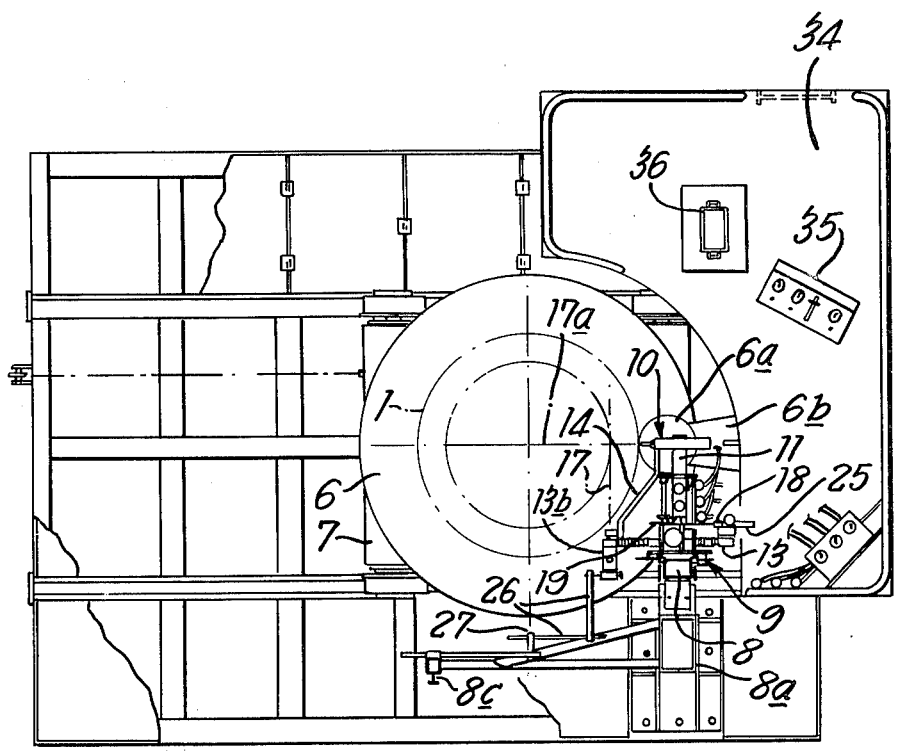
FIG. 8 is a plan view of the apparatus shown in FIG. 6.

The pin 27 is adjusted on the secondary column 8c to a position in which it is located approximately mid-way between the vertical spacing of positions A and B of the profiled end of the tube. With the cutter 10 positioned on the carriage 9 to correspond with the first position A on the profiled tube end, the cutter is arranged on the arm 14 to provide the required bevel angle (of say 15°) subtended between the bevel surface and the axis of tube 1. As cutting of the bevel surface commences from the position A and the tube rotates beneath the cutter 10, the carriage 9 is moved vertically over the support 8 to follow the profile of the tube end and thereby the relative movement between the carriage 9 and pin 27 causes the rod 26 to progressively rotate the shaft 16. This results in the angle subtended between the bevel surface 4 and the axis of the tube 1 to progressively increase to a maximum when the tube has rotated for the cutter to be located at a region 4a (FIG. 5). Further rotation of the tube beyond the region 4a, through the position B and beyond the second region 4a causes the angle subtended by the bevel surface to be progressively decreased until the position A is again reached by the cutter. The regions 4a indicate where the cutter has rotated under control of the Morgan system sufficiently for the flame to move out of the wall of the tube so that no bevel cutting is effected for the peripheral extent of the profiled end face from one region 4a, through position B, to the other region 4a. The lost motion connection between the rod 26 and pin 27 ensures that the carriage 9 is free to move relative to the pin 27 as the carriage is displaced vertically over the column 8 and also as the sub-frame 13 is displaced in the carriage 9. For convenience the rod 26 is shown as being straight in FIGS. 9 and 10 whereas in practice it is likely to be of dog-legged form as shown in FIG. 8.

During rotational movement of the cutter 10 about the axis 17 and also during radial displacement of the axis 17 through the wall thickness of the tube 1 it will be apparent that the cutter, particularly the nozzle 28 thereof will be displaced radially relative to the tube 1 and as a result there may be variations in cutting efficiency. To alleviate this possibility the nozzle 28 is motor controlled to be capable of controlled movement radially of the tube 1 and relative to the arm 14. As shown in FIG. 9 the cutter 10 comprises a housing 29 secured to the arm 14 and within which housing is maintained the nozzle 28. The nozzle 28 is capable of sliding movement in its housing in the radial direction of the tube 1 and has fixedly attached thereto a fixed nut 30 which engages with a lead screw 31. The lead screw is rotationally mounted in bearings in the housing and is driven by an electric motor 32 through gearing 33. Upon rotation of the lead screw 31 the nozzle 28 will be driven towards or from the outer face of the tube 1 so that optimum flame cutting conditions can be maintained irrespective of variations in radial spacing between the housing 29 and the tube 1. Energization of the motor 32 to effect displacement of the nozzle 28 is manually controlled by an operator supervising the cutting operation. The apparatus includes an operators platform 34 from which the cutting operation is eventually supervised and which carries a control unit 35 for the equipment. The platform 34 is mounted on a vertical column 36 to be capable of vertical displacement thereon so that the operator can follow vertical movement of the carriage 9 and thereby remain in the vicinity of cutting. Vertical displacement of the platform 34 may be achieved through a rack and pinion drive mechanism provided between the platform and the column 36. If required, the drive system for displacing the platform 34 may be automatically controlled simultaneously with the drive system for displacing the carriage 9 so that the platform automatically follows the carriage.

If the cutter 10 is to be used for forming on initial profiled end face 3 which is maintained at right angles to the axis of the tube 1 then the cutter 10 is appropriately orientated and secured about the axis 17 and the shaft 18 uncoupled from the rod 26 and the pin 27.

While it is convenient to form the profiled end face 3 so that such end face is always maintained at right angles to the axis of the tube 1 it is not essential and, if required, the profiled end face may subtend an acute angle with the axis of the tube wholly or partially around its peripheral extent provided that the transition line is located in such end face. To form such a profiled end face which is effectively an internal or external bevel surface on the profiled end of the tube, the cutter 10 is pivoted on the shaft 16 about the axis 17 to form the required acute angle with the axis of the tube 1 and thereafter cutting is commenced. During such cutting the aforementioned Morgan system 26, 27 for automatically controlling rotational or pivotal movement of the cutter 10 is disconnected, however, the control system for radial displacement of the cutter 10 relative to the axis of the tube 1 by engagement of the cam plate 19 with the roller 18 is maintained to ensure that throughout the formation of the profiled end face such face will be cut in a manner whereby the transition line 5 will be located somewhere on the resulting profiled end face. After cutting of the profiled end face so that, in the present embodiment part of the peripheral length of such end face will be inclined relative to the axis of the tube 1, the Morgan system is reconnected and transition line cutting effected to provide the appropriate bevelling of the profiled end face. During bevel cutting with the Morgan control system operative it is possible that the bevel which is formed at the end of the tube will run-out into the profiled end face (as previously discussed and shown at regions 4a in FIG. 5).

It will be realised that by appropriate selection of the pattern or cam surface which is presented to displace the roller 18 of the sub-frame 13, the cutter 10 can be controlled in its radial displacement relative to the tube 1 to cut a bevel surface at the end of the tube which forms any predetermined transition line with the end face of the tube irrespective of the cross-sectional shape of the tube provided that the intersection of the axis 17 with the cutting flame is substantially maintained in the plane of the end face.

Figure 11:
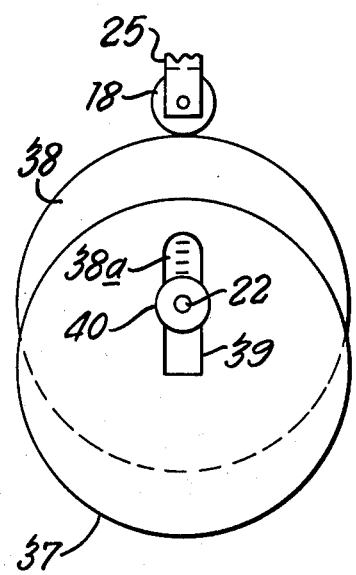
FIG. 11 is a side elevation of a modified form of pattern which may be incorporated in the arrangement of FIGS. 9 and 10 and which pattern may be adjusted to provide a cam surface that the cutter is to follow to provide a predetermined transition line.
Figure 12:
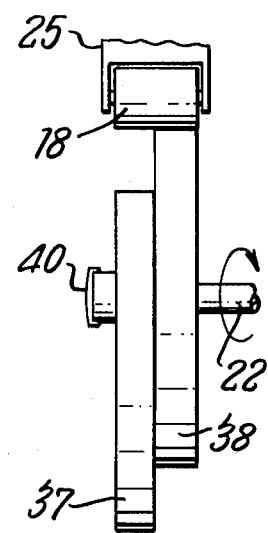
FIG. 12 is an end elevation of the adjustable pattern as shown in FIG. 11.

In the form of cam plate 19 as shown in FIGS. 9 and 10 the plate 21 is releasably secured by bolts to the plate 20 so that the plate 21 may easily be replaced by another plate comprising a different cam surface for changing the characteristics of the transition line which is to be formed at the profiled end of the tube. A modified form of pattern which may replace the cam plate 19 shown in FIGS. 9 and 10 is illustrated in FIGS. 11 and 12. This modified pattern is constituted by the peripheral surface presented by a pair of overlying circular discs 37, 38 of equal diameters. These discs are coupled together for unified rotation with the shaft 22. The disc 37 is provided with a radially extending slot 39 through which the shaft 22 extends and this disc is secured to the shaft 22 and to the disc 38 by a lock nut 40. By release of the lock nut 40 and sliding the slot 39 over the shaft 22 the disc 37 may be radially displaced to a predetermined extent relative to the disc 38, the latter being secured concentrically with the shaft 22. By displacing the discs 37, 38 eccentrically in this manner and thereafter tightening the lock nut 40 a figure eight profile is presented by the outermost peripheries of the combined discs and which profile is followed by the roller 18 as the unified discs rotate with the shaft 22. With the discs 37, 38 in overlying concentric relationship there will be no displacement of the sub-frame 13 radially relative to the tube 1 as the pattern is rotated and therefore the axis 17 will be maintained at a predetermined radial position relative to the cylindrical surfaces of the tube 1. To provide predetermined cutting along a transition line in the profiled end face of the tube 1 the disc 37 is displaced eccentrically relative to the disc 38 to an extent which corresponds to the wall thickness of the tube 1; for example with a tube wall thickness of 5 inches the disc 37 is positioned so that its lowermost peripheral edge is 5 inches below the lowermost peripheral edge of the disc 38. To facilitate adjustment of the discs 37 and 38 in determining an appropriate figure eight cam profile, the disc 38 is provided with a radially extending scale 38a from which the amount of radial displacement of disc 37 relative thereto can easily be determined to correspond to the wall thickness of the tube which is to be bevelled.

If the end face 3 is profiled so that it includes a generally circular notional line of contact when viewed axially of the tube and if such a notional line of contact has a diameter equal to that of the outer diameter of the tube 1 less the wall thickness of the tube, is eccentric with the axis of the tube so that it lies on the outer diameter of the end face 3 in the first position A and on the inner diameter of the end face 3 in the second position B, then the pattern followed by the roller 18 may be in the form of a single circular disc which is radially displaceable to an eccentric position on the shaft 22. This single disc pattern is displaced and secured eccentrically to the shaft 22 to an extent which is equal to one half of the wall thickness of the tube 1 and is appropriately orientated so that the roller 18 displaces the cutter 10 to substantially cut along the notional line.

The apparatus as above described and illustrated with reference to FIGS. 6 to 12 refers to the profiled tube end being shaped while the tube is being rotated with its axis vertical and there will now be described with reference to FIGS. 13 to 15 a further embodiment of the apparatus in which the profiled end of the tube is formed and may be bevelled while the tube is rotatably supported with its axis horizontal. For convenience similar parts or members in FIGS. 13 to 15 to those in FIGS. 6 to 10 have been accorded the same references.

Figure 14:
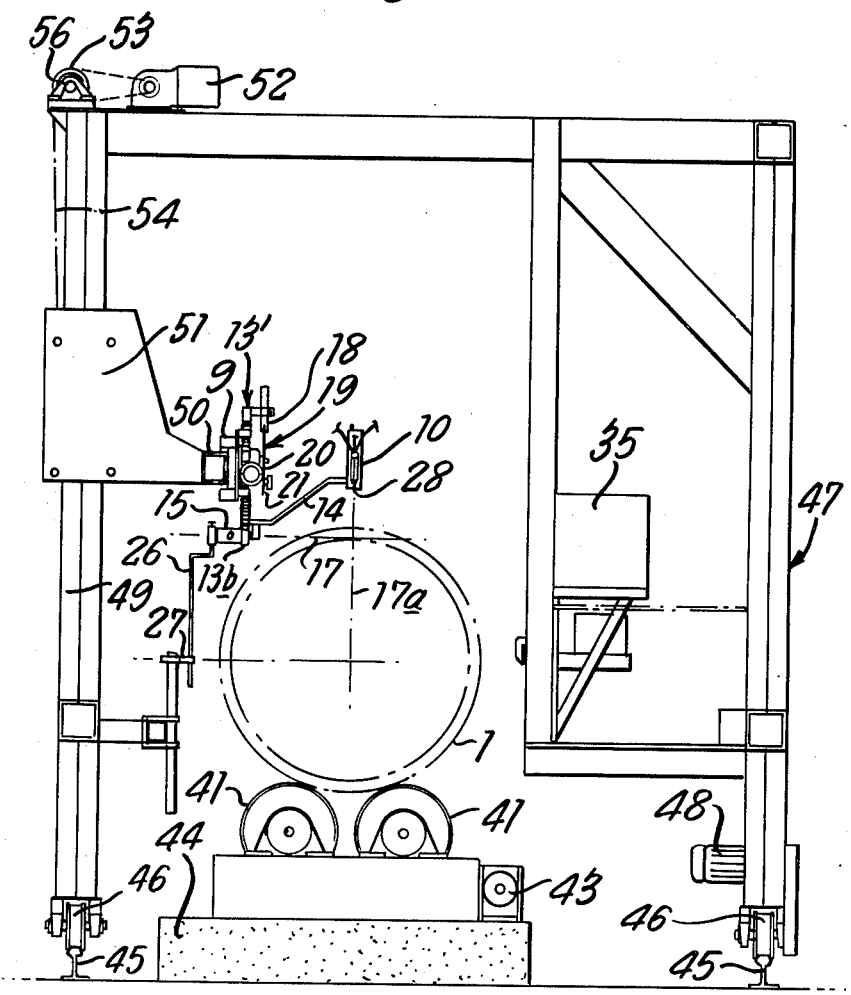
FIG. 14 is an end elevation of the apparatus shown in FIG. 13 as seen from the position of arrows XIV in FIG. 13.
Figure 15:
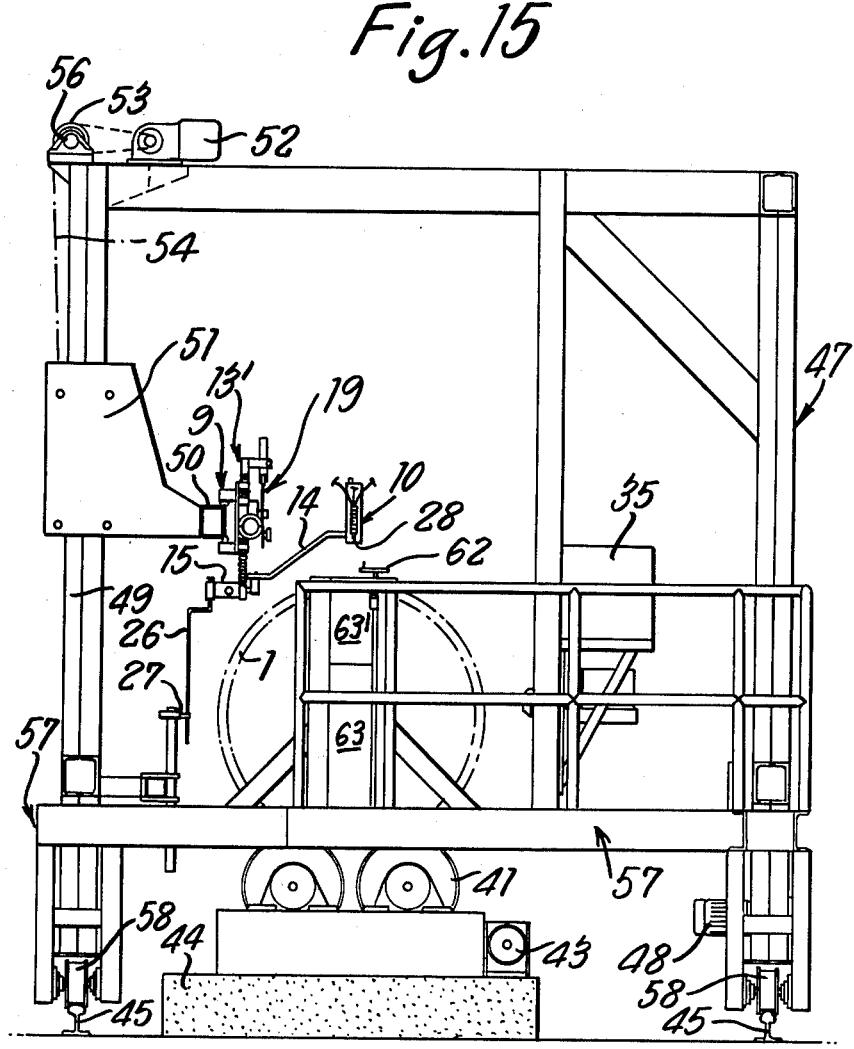
FIG. 15 is an end view of the apparatus shown in FIG. 13 as seen from the position of arrows XV in FIG. 13.

In FIGS. 13 to 15 the tube 1 is mounted with its axis horizontal on two sets of horizontally spaced rollers 41 and 42. Rollers in each of the two sets straddle the tube whilst those in set 41 are idler rollers and the rollers in set 42 are rotatably driven by an electric motor 43. By energisation of the motor 43 the rollers 42 impart drive to the tube 1 so that the latter is rotated about its horizontal axis. The sets of rollers are mounted on fixed bases 44 between a pair of parallel ground rails 45 which extend parallel to the axis of tube 1. Mounted through wheels 46 on the rails 45 is a box-like framework 47 which is movable along the rails to straddle the tube 1 after the latter has been mounted on the rollers 41 and 42. One of the wheels 46 is rotatably driven by an electric motor 48 to move the framework 47 as required. One side of the framework 47 includes a spaced array of three vertical columns 49. These columns 49 provide location through guide plates 51 for a horizontal beam 50 which is vertically slidable with the plates 51 along the respective columns 49 so that the height of the beam relative to the rollers 41 is adjustable. Vertical displacement of the beam 50 is controlled by an electric motor 52 which actuates winch systems 53 having cables 54 connected at longitudinally spaced positions to the guide plates 51. As shown in FIG. 13, three winch systems are provided which are driven by a common shaft 55 rotated by the motor 52, the shaft 55 is mounted in bearings 56 on the framework.

Figure 6:
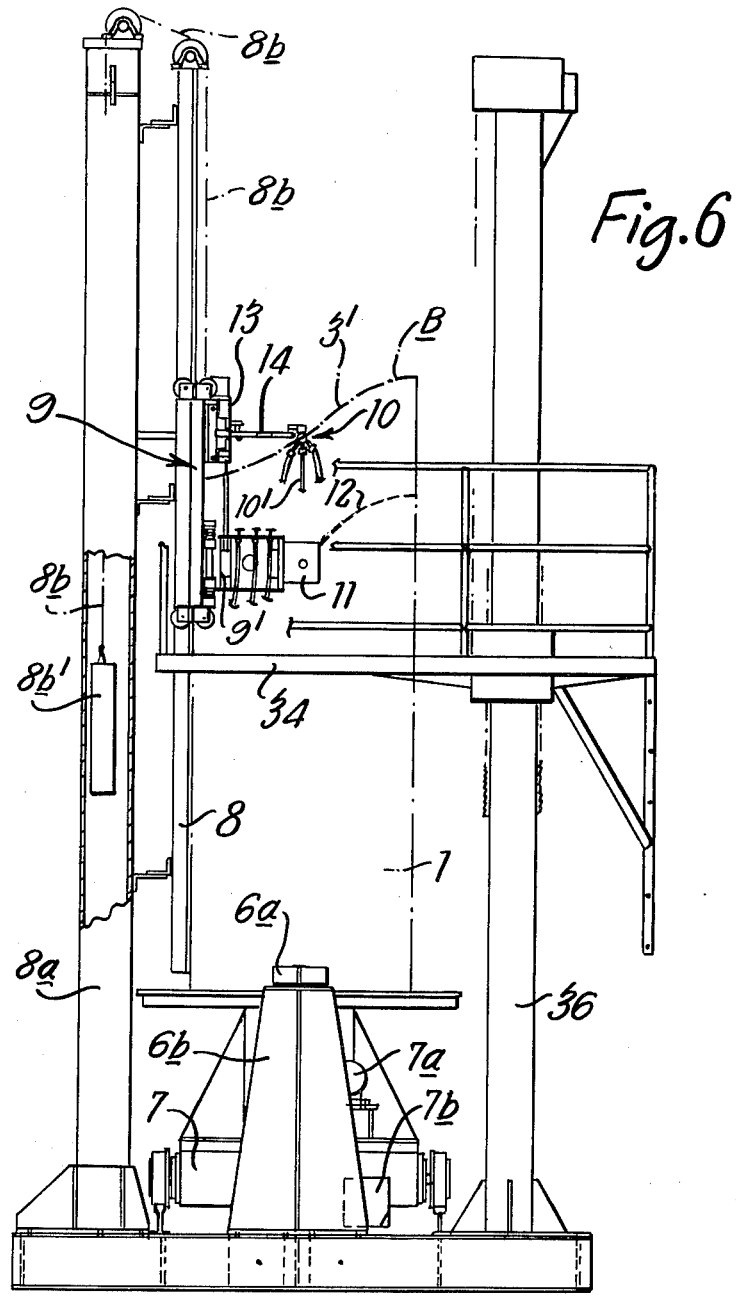
FIG. 6 is a side elevation of one embodiment of tube cutting apparatus constructed in accordance with the present invention and by which the end of the branch tube shown in FIGS. 1 to 5 may be profiled and shaped while said branch tube is disposed with its axis vertical.
Figure 7:
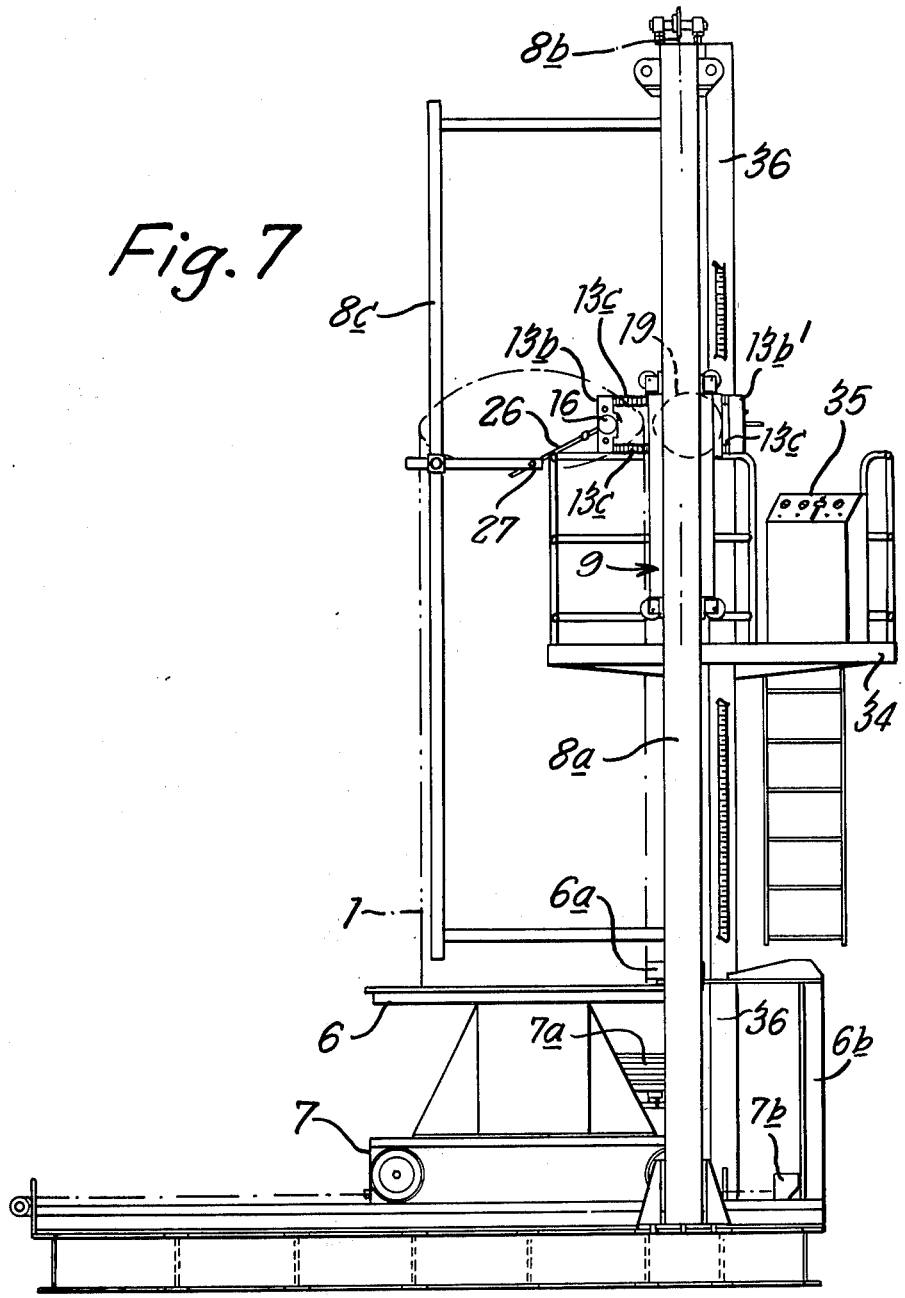
FIG. 7 is an end elevation of the apparatus shown in FIG. 6.

The beam 50 serves a similar purpose to the column 8 in FIG. 6 in that there is mounted on the beam 50 for controlled horizontal movement along the beam a carriage 9 on which is situated or coupled thereto a flame cutter 10, optical scanning unit 11, displaceable subframe 13, cam plate 19 and associated components (including the Morgan linkage system 26, 27) for controlling displacement of the cutter 10 radially relative to the axis of the tube 1 and rotation of the cutter in a similar manner to that described with reference to FIGS. 9 and 10. Consequently the scanning unit 11 follows a line 12 (shown as the right hand end of the tube in FIG. 13) previously drawn around the periphery of the tube 1 to correspond with the desired path of the profiled end 3 of the tube but axially spaced therefrom by a horizontal distance corresponding to the horizontal spacing between the cutter 10 and optical scanner 11. In this way as the scanner 11 is adjusted horizontally to follow the line 12 which rotates beneath it, the carriage 9 and thereby the cutter 10 automatically move to cut appropriately shaped end profiles.

The cam plate 19 is driven by its motor 23 at the same angular velocity as that at which the tube 1 is axially rotated as previously described. To ensure that the speed at which the cam plate 19 rotates is synchronised to the speed at which the tube 1 rotates so that both these components complete one revolution in the same time, the rate at which the motor 23 is actuated to drive its cam plate is synchronised with the speed at which the tube is rotated. To provide such synchronisation the apparatus includes an end carriage unit 57 which is horizontally displaceable on rollers 58 along the rails 45 until an arm 59 on the end carriage unit adjacent to the end of the tube 1 remote from that end 3 which is to be profiled can be coupled at 60 to the wall of the tube 1. The arm 59 is rotatable with a shaft 61 and the axis of this shaft is located to lie in the same vertical plane as the axis of the tube 1. In addition, the shaft 61 is vertically adjustable on the carriage 57 by a screw mechanism 62 so that the axis of the shaft can be brought into line with the axis of the tube 1. When the shaft 61 has been adjusted to be concentric with the tube 1 and the arm 59 connected to the wall of the tube it will be seen that the arm 59 will rotate the shaft 61 as a result of rotation of the tube 1. The rotating shaft 61 provides an output by way of a gear system 63 and master synchro motor 63' which output serves as a controlling input signal to the motor 23 driving the cam plate 19, which input signal controls the drive to the cam plate 19 so that the latter is rotated at an angular velocity equal to that at which the tube 1 is rotated.

The cutting of the profiled end face 3 of the tube and transition line bevelling of that end face are carried out in a similar manner to that previously described in the earlier embodiment except that the carriage 9 is displaced horizontally while its sub-frame 13 is displaceable vertically during transition line bevelling.

It will be apparent that the vertical positioning of the cutter 10 will have to be altered for tubes of different external diameters and this is achieved by appropriate vertical displacement of the beam 50 as aforementioned.

The immense size and weight of tubes which may be used in the construction of jackets for off-shore drilling rigs generally renders them unsuitable for convenient handling and it may be required to provide each end of a tube with an appropriately profiled end face and transition line bevelling. To alleviate the problem of re-orientating the horizontal tube 1 on the rollers 41, 42 after profiling and bevelling one end of the tube the apparatus is provided on its carriage 9 with a second sub-frame 13' and associated components identical to those associated with the sub-frame 13. The sub-frame 13' and its associated components are located on the carriage 9 on the side of the scanning unit 11 remote from the sub-frame 13. By such an arrangement the scanning unit 11 is common to both cutters 10 for controlling their horizontal displacement and the cutter 10 on sub-frame 13' may be moved with the carriage 9 horizontally under control of the scanning unit 11 for profile and bevel cutting of the lefthand end of the tube 1 as shown in FIG. 13 whilst the tube is rotated on the rollers 41, 42. In re-adjusting the apparatus for cutting the lefthand end of the tube 1 the arm 59 is disengaged from the tube 1 and the carriage 57 withdrawn while the box-like frame 47 is driven along the rails 45 leftwardly in FIG. 13 until the optical unit 11 can scan a previously drawn line towards the lefthand end of the tube 1. The cam plate 19 associated with the sub-frame 13' is rotated by motor 23' at the same angular velocity as that at which the tube 1 is rotated. To achieve this synchronization between rotation of the tube and rotation of the cam plate 19 which is to the left of the scanner unit 11 in FIG. 13, a second carriage 64 is provided which is movable along the rails 45 in a similar manner to the carriage 57. The carriage 64 is provided with a rotatable arm 59, coupling device 60, shaft 61, gear system 63, master synchro motor 63' and a vertical adjustment mechanism 62 similar to those of carriage 57. Consequently the arm 59 of carriage 64 is manoevered to engage with the righthand end of the tube 1 so that as the tube rotates the output signal derived from the motor 63' of carriage 64 provides a controlling input signal to the motor 23' of the cam plate 19 associated with the sub-frame 13' to ensure that the drive to that cam plate is synchronised with rotation of the tube 1 as aforementioned.

The main advantage which the apparatus shown in FIGS. 13 to 15 has over the earlier described embodiment is the facility which it provides as aforementioned for profiling and bevelling both ends of a tube without need for adjustment in the position of the tube. Alternatively however the main advantage provided by the apparatus in the embodiment shown in FIGS. 6 to 8 over the horizontal machine is the facility which it provides to profile and bevel the end of a short length or stub tube resulting from the fact that the whole axial length of the tube is available to be cut by the cutter (for example, since the outer surface of the tube is not engaged by chuck jaws or the like).

What is claimed is:

1. Apparatus for forming a profiled end face of a tube having a substantial wall thickness to enable said tube to be joined to an intersecting surface which comprises:
   a cutter disposed in cutting position relative to the wall of the tube;
   drive means to produce relative rotational movement between said cutter and the tube;
   means for moving the cutter axially along the wall of the tube to follow a predetermined profile;
   means for pivoting said cutter about a secondary axis which is perependicular to the axis of the tube and is intersected by the center line of the cutter to dispose the cutter at a desired angular position relative to the axis of the tube;
   cutter control means comprising a displaceable mounting for moving said secondary axis radially across the thickness of the end face; and
   means synchronizing the radial movement of said secondary axis with said rotational movement to move the intersection of said secondary axis and the center line of said cutter along a desired path across the end face of said tube as said tube is moved relative to said cutter.

2. Apparatus for forming a profiled end face of a tube having a substantial wall thickness to enable said tube to be joined along an endless notional line of contact which includes inner and outer peripheral edges of the tube which comprises:
   a cutter disposed in cutting position relative to the wall of the tube;
   drive means to produce relative rotational movement between said cutter and the tube;
   means for moving the cutter axially along the wall of the tube to follow a predetermined profile;
   means for pivoting said cutter about a secondary axis which is perpendicular to the axis of the tube and is intersected by the center line of the cutter to dispose the cutter at a desired angular position relative to the axis of the tube;
   cutter control means comprising a displaceable mounting for moving said secondary axis radially across the thickness of the end face; and
   means synchronizing the radial movement of said secondary axis with said rotational movement to move the intersection of said secondary axis and the center line of said cutter along the notional line to produce an edge which defines the line of contact between said tube and said surface.

3. The apparatus according to claim 2 which further includes a pattern defining the path of said notional line and a follower adapted to follow said pattern in a manner synchronously related to the relative movement between the cutter and the tube to control the radial movement of said secondary axis.

4. The apparatus according to claim 3 wherein the pattern comprises a rotatable cam having a cam surface engaging the follower which comprises a cam follower to determine radial displacement of the displaceable mounting and thereby the cutter.

5. The apparatus according to claim 4 which further includes a second drive means for rotating the rotatable cam at an angular velocity equal to the angular velocity of the relative movement between the cutter and the tube.

6. The apparatus according to claim 2 which further comprises mounting means for locating the tube and rotating it about its longitudinal axis relative to the cutter so that the tube revolves past the cutter.

7. The apparatus according to claim 6 wherein said mounting means comprises a horizontal turntable rotatable about a vertical axis on which the tube is supported with its longitudinal axis vertical and the uppermost end of the tube adjacent the cutter, and wherein the mounting means rotates the tube about its longitudinal axis relative to the cutter.

8. The apparatus according to claim 6 wherein said mounting means comprises rollers rotatable about parallel horizontal axis on which the tube is supported with its longitudinal axis horizontal, and wherein the mounting means rotates the tube about its longitudinal axis relative to the cutter.

9. The apparatus according to claim 8 which further comprises:
   a second cutter horizontally spaced from the cutter disposed in a cutting position relative to the tube; and
   an optical scanning line follower disposed between the two cutters and adapted to selectively maintain the position of each cutter along a predetermined end profile path on opposite ends of the tube during the relative rotation between the cutter and the tube.

10. The apparatus according to claim 2 which further comprises:
    a carriage supporting the cutter for movement axially along the wall of the tube; and
    an optical scanning line follower to maintain the position of the cutter along a predetermined end profile path during the relative rotation between the cutter and the tube.

11. The apparatus according to claim 2 which further comprises a linkage connectable to the cutter having a pivot point fixed relative to the longitudinal axis of the tube so that during axial displacement between the cutter and tube the linkage imparts pivotal movement to the cutter in a plane which is parallel to and includes the longitudinal axis of the tube and wherein the cutter is disconnectable from the linkage so that it can be maintained at a predetermined angle relative to the longitudinal axis of the tube which is constant during relative rotational movement between the tube and the cutter.

12. In a tube beveling apparatus of the type for profiling the end of a tube to provide an end face which may be joined to an intersecting surface by a continuous joint, and wherein a cutter is moved relative to the periphery of the tube and is disposable at a variable angle to the tube about a second axis which is intersected by the center line of the cutter to cut a predetermined bevel in the end face of the tube, the improvement of an apparatus which profiles the end face to form in the end face a continuous line of contact which includes part lengths of each of the inner and outer surfaces of the tube connected by a transition line extending across the thickness of the end fact, which improvement comprises:

a displaceable mounting for said cutter for moving said second axis radially with respect to the tube; and means to move said second axis radially in synchronous relation with the relative movement of said cutter and said tube to cause the point of intersection of the cutter center line and said second axis to follow said continuous line of contact and cause said cutter to cut said end face to provide a bevelled end face surface which intersects said continuous line of contact as it proceeds across the thickness of the tube between the inner surface and outer surface of the tube.

13. The apparatus according to claim 12, wherein said means to move the second axis radially comprises:

a cam corresponding in shape to said continuous line of contact, which cam rotates at the same angular velocity as the relative movement between the cutter and tube; and a cam follower which moves said cutter radially.

14. Apparatus for forming in two cuts a junction line on the end face of a tube having a substantial wall thickness said junction line following the notional line of contact between the tube and a surface with which the tube may be joined, which junction line extends across the end face of the tube from a first position on the inner tube wall to a second position on the tube wall across the end face of the tube, which comprises:

a cutter disposed in cutting position relative to the wall of the tube;

drive means to produce relative rotational movement between the cutter and the wall of the tube;

means for moving the cutter axially along the wall of the tube during said relative rotation to profile the end of the tube on the first cut to form an end face which includes on its surface a notional line corresponding to said junction line and to follow said profile on the second cut; and means for radially displacing said cutter during said relative rotation and axial movement on the second cut to partially bevel the end face along said notional line to form said junction line.

15. Apparatus for cutting the end of a tube having a substantial wall thickness which comprises:

a cutter disposed in cutting position relative to the wall of the tube;

drive means to produce relative rotational movement between the cutter and the tube;

means for moving the cutter axially along the length of the tube during said relative rotational movement for substantially maintaining the position of the cutter on a predetermined peripheral path at the end of the tube;

means for pivoting said cutter to an angular position with respect to the longitudinal axis of the tube about a secondary axis which is perpendicular to said longitudinal axis;

cutter control means comprising a displaceable mounting for moving said secondary axis radially with respect to said tube to permit said cutter when disposed at an angle to said longitudinal axis to cut a bevel surface at the end of the tube extending between the end face of the tube and the peripheral surface of the tube and forming a junction line with the end face of the tube;

pattern means;

follower means which follows and moves relative to said pattern means, said pattern means and follower means determining radial displacement of the mounting so that during said relative rotation and axial displacement between the tube and cutter the junction line formed follows a predetermined path around the periphery of the end face; and means synchronizing relative movement between the pattern means and the follower means with said drive means so that movement between the pattern means and the follower means imparts radial displacememnt to the mounting through a predetermined cycle.

16. Apparatus for cutting the end of a tube having a substantial wall thickness which comprises:

a cutter disposed in a cutting position relative to the wall of said tube;

means for mounting said tube with its longitudinal axis horizontal, said mounting means to rotate said tube about its longitudinal axis relative to said cutter;

means for moving the cutter axially along the length of the tube during said relative rotational movement for substantially maintaining the position of the cutter on a predetermined peripheral path at the end of the tube, said means including a carriage to support said cutter;

means for pivoting said cutter to an angular position with respect to the longitudinal axis of the tube about a secondary axis which is perpendicular to said longitudinal axis;

cutter control means comprising a displaceable mounting for moving said secondary axis radially with respect to said tube to permit said cutter when disposed at an angle to said longitudinal axis to cut a bevel surface at the end of the tube extending between the end face of the tube and the peripheral surface of the tube and forming a junction line with the end face of the tube;

pattern means;

follower means which follows and moves relative to said pattern means, said pattern means and follower means determining radial displacement of the mounting so that during said relative rotation and axial displacement between the tube and cutter the junction line formed follows a predetermined path around the periphery of the end face;

means synchronizing relative movement between the pattern means and the follower means with said drive means so that movement between the pattern means and the follower means imparts radial displacement to the mounting through a predetermined cycle;

a line follower mounted on said carriage to automatically adjust the axial position of the cutter to follow a guide line on said tube; and a second cutter disposed on said carriage and horizontally spaced from the cutter disposed in a cutting position relative to the wall of the tube with the line follower disposed between the two cutters such that the line follower can selectively maintain the position of each cutter along a predetermined end profile on opposite ends of the tube during said relative rotation between the cutter and tube.

* * * * *